(12) United States Patent
Pifer

(10) Patent No.: US 10,893,749 B1
(45) Date of Patent: Jan. 19, 2021

(54) HARDWARE HANDLE ASSEMBLY

(71) Applicant: LIBERTY HARDWARE MFG. CORP., Winston-Salem, NC (US)

(72) Inventor: Kelly Nicole Pifer, Winston-Salem, NC (US)

(73) Assignee: LIBERTY HARDWARE MFG. CORP., Winston-Salem, NC (US)

( * ) Notice: Subject to any disclaimer, the term of this patent is extended or adjusted under 35 U.S.C. 154(b) by 0 days.

(21) Appl. No.: 16/583,361

(22) Filed: Sep. 26, 2019

(51) Int. Cl.
*A47B 95/02* (2006.01)
*E05B 1/00* (2006.01)
*F16B 33/00* (2006.01)
*F16B 37/16* (2006.01)

(52) U.S. Cl.
CPC ............ *A47B 95/02* (2013.01); *E05B 1/0015* (2013.01); *A47B 2095/024* (2013.01); *F16B 33/00* (2013.01); *F16B 37/16* (2013.01)

(58) Field of Classification Search
CPC . Y10T 16/458; Y10T 16/462; Y10T 16/4644; Y10T 16/513; Y10T 16/498; A47B 95/02; A47B 95/023; A47B 2095/023; A47B 2095/024; E05B 1/00; E05B 1/0015; E05B 1/0053; E05B 85/10; E05B 79/06; F25D 23/02; F25D 23/028; F25D 2400/06; F16B 33/00; F16B 37/16
See application file for complete search history.

(56) References Cited

U.S. PATENT DOCUMENTS

| 846,441 A | 12/1907 | Ammann | |
|---|---|---|---|
| 1,383,826 A | 7/1921 | Lapham | |
| 1,652,052 A * | 12/1927 | Rukenbrod | E05B 1/0015 16/412 |
| 2,066,301 A | 12/1936 | Plack | |
| 3,156,944 A * | 11/1964 | Bohn | E05B 1/0015 16/412 |
| 3,164,354 A * | 1/1965 | Murdock | E04F 11/1804 248/251 |
| 3,195,843 A | 7/1965 | Olbrich | |
| 3,197,803 A * | 8/1965 | Williamson | A47B 95/02 16/416 |
| 3,484,894 A * | 12/1969 | Fletcher | A47B 95/02 16/422 |

(Continued)

FOREIGN PATENT DOCUMENTS

| CN | 206603481 U | 11/2017 |
|---|---|---|
| CN | 304687917 S | 6/2018 |

(Continued)

*Primary Examiner* — Chuck Y Mah
(74) *Attorney, Agent, or Firm* — Brooks Kushman P.C.; Lora Graentzdoerffer

(57) ABSTRACT

A handle assembly is provided with a handle sized to be grasped manually with a slot formed along a length. A first plurality of fasteners is provided, each with a shank and a head sized to be received in the slot to fasten the handle to a drawer or a door at various fastener mounting patterns. A method to install a handle assembly inserts a shank of at least one fastener through an aperture in a drawer or a door. A handle is provided that is sized to be grasped manually with a slot formed along a length. The slot of the handle is slid along a head of the at least one fastener. The at least one fastener is tightened.

17 Claims, 4 Drawing Sheets

(56) References Cited

U.S. PATENT DOCUMENTS

| | | | |
|---|---|---|---|
| 3,758,920 A * | 9/1973 | Dobrjanskyj | A47B 95/02 16/414 |
| 3,812,757 A | 5/1974 | Reiland | |
| 4,022,099 A | 5/1977 | Ballantyne | |
| 4,524,483 A | 6/1985 | Lynham et al. | |
| 5,529,288 A * | 6/1996 | Cheng-I | E04F 11/1804 256/59 |
| 5,727,858 A | 3/1998 | Shapiro | |
| 5,875,903 A * | 3/1999 | Chen | A47K 10/10 211/105.1 |
| 6,003,202 A | 12/1999 | Dauterive | |
| 6,796,442 B1 * | 9/2004 | Wu | A47K 10/04 211/105.1 |
| 6,932,328 B2 * | 8/2005 | Shreiner | E04F 11/1804 248/251 |
| 7,048,347 B1 * | 5/2006 | Liu | B25H 3/028 312/332.1 |
| 7,197,792 B2 * | 4/2007 | Moon | E05B 1/0015 16/412 |
| 7,600,299 B2 * | 10/2009 | Hendrickson | A47K 10/10 16/412 |
| 7,810,216 B2 | 10/2010 | Zubiaurre et al. | |
| 8,523,126 B2 * | 9/2013 | Garrels | A47K 17/022 211/105.1 |
| 8,813,995 B2 * | 8/2014 | Kim | F25D 23/028 16/412 |
| D794,413 S | 8/2017 | Abrahams | |
| 9,883,745 B2 * | 2/2018 | Gonzales | A47B 95/02 |
| 9,909,338 B1 | 3/2018 | Abrahams | |
| 2007/0044275 A1 * | 3/2007 | Gurzenda | E05B 1/0015 16/412 |
| 2008/0258594 A1 | 10/2008 | Giagni et al. | |
| 2009/0106942 A1 * | 4/2009 | Dell'Orfano | A47B 95/02 16/425 |
| 2011/0179603 A1 | 7/2011 | Edelen | |
| 2013/0215381 A1 | 8/2013 | Raghuprasad | |
| 2016/0150881 A1 * | 6/2016 | Weissenbach | A47B 95/02 312/237 |
| 2018/0185970 A1 * | 7/2018 | Simmons | B23P 19/04 |
| 2019/0085886 A1 | 3/2019 | Davis et al. | |
| 2019/0360234 A1 * | 11/2019 | Alkoby | E05B 1/0015 |

FOREIGN PATENT DOCUMENTS

| | | |
|---|---|---|
| CN | 304950397 S | 12/2018 |
| CN | 305234751 S | 6/2019 |
| CN | 305279381 S | 7/2019 |
| EP | 0678258 B1 | 1/1999 |
| EP | 1383367 A1 | 1/2004 |
| FR | 1238431 A | 8/1960 |
| FR | 1352937 A | 2/1964 |
| GB | 827325 | 2/1960 |
| GB | 881660 | 11/1961 |
| GB | 982416 | 2/1965 |
| JP | 0001577037 S | 5/2017 |
| KR | 200315597 Y1 | 5/2003 |

* cited by examiner

HARDWARE HANDLE ASSEMBLY

TECHNICAL FIELD

Various embodiments relate to hardware handle assemblies for drawers or doors of cabinets or other household applications.

BACKGROUND

Handle assemblies for home hardware applications, such as cabinetry, typically employ a pair of fasteners to assemble to a door or drawer. The fasteners are often spaced apart by various distances.

SUMMARY

According to at least one embodiment, a handle is sized to be grasped manually with a slot formed along a length to receive a head of each of a plurality of fasteners to fasten the handle to a drawer or a door at various fastener mounting patterns.

According to a further embodiment, the handle is formed with a consistent cross-section.

According to another further embodiment, the handle is extruded.

According to another further embodiment, the handle is provided with a body. The slot is formed along the body. A grip portion is sized to extend from the body spaced apart from the slot and is sized to be grasped manually.

According to an even further embodiment, an opening is formed through the body adjacent the grip portion to be grasped manually.

According to another further embodiment, the slot has a narrow region formed into the handle to permit the plurality of fasteners to pass into the handle, and an enlarged region intersecting the narrow region and sized to receive an enlarged portion of a fastener.

According to at least another embodiment, a handle assembly is provided with a handle sized to be grasped manually with a slot formed at least partially along a length. A first plurality of fasteners is provided, each with a shank and a head sized to be received in the slot to fasten the handle to a drawer or a door at various fastener mounting patterns.

According to a further embodiment, the slot is formed along an entire length of the handle. The handle has a mounting surface to engage the drawer or door. The first plurality of fasteners extends through the mounting surface.

According to another further embodiment, a plurality of sleeves is each sized to receive the shank of one of the first plurality of fasteners to space the handle away from the drawer or door.

According to another further embodiment, a second plurality of fasteners is sized to engage the shank of each of the first plurality of fasteners to fasten the handle to the drawer or the door.

According to an even further embodiment, the shank of each of the first plurality of fasteners is externally threaded.

According to an even further embodiment, each of the second plurality of fasteners is internally threaded and sized to receive each of the externally threaded shanks.

According to another even further embodiment, the shank of each of the first plurality of fasteners is internally threaded. Each of the second plurality of fasteners is externally threaded and sized to be received in the internally threaded shanks of the first plurality of fasteners.

According to an even further embodiment, the slot has a width sized to receive the heads of the first plurality of fasteners. The width of the slot is consistent along a depth of the slot. A retainer is attached to the handle and sized to engage the heads of the first plurality of fasteners to retain the first plurality of fasteners to the handle. The retainer has a slot formed therethrough and sized to permit the shanks of each of the first plurality of fasteners to pass through the retainer.

According to another further embodiment, a second plurality of fasteners is sized to be received upon the shank of each of the first plurality of fasteners to fasten the handle to the drawer or the door without an adjustable post to receive the first plurality of fasteners.

According to another further embodiment, the handle is formed with a consistent cross-section.

According to another further embodiment, the handle is extruded.

According to another further embodiment, the handle is provided with a body. The slot is formed along the body. A grip portion is sized to extend from the body spaced apart from the slot and is sized to be grasped manually.

According to another further embodiment, the slot has a narrow region formed into the handle to permit the first plurality of fasteners to pass into the handle, and an enlarged region intersecting the narrow region and sized to receive the head of each of the first plurality of fasteners.

According to an even further embodiment, the head of each of the first plurality of fasteners is formed with at least a pair of opposed flats sized to be received within the enlarged region of the slot.

According to another even further embodiment, the enlarged region of the slot is sized to prevent rotation of each of the first plurality of fasteners.

According at least another embodiment, a method to install a handle assembly inserts a shank of at least one fastener through an aperture in a drawer or a door. A handle is provided that is sized to be grasped manually with a slot formed along a length. The slot of the handle is slid along a head of the at least one fastener. The at least one fastener is tightened.

According to a further embodiment, a handle assembly with at least one fastener is removed from the aperture in the drawer or the door before inserting the shank of the at least one fastener through the aperture.

According to another further embodiment, a second fastener is installed upon the at least one fastener to tighten the at least one fastener.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Handle assemblies typically employ a pair of fasteners to assemble to a door or drawer of household cabinetry and the like. The fasteners are often spaced apart by various distances. However, handles wear and fail over time and require replacement. It can become difficult to find replacement handles for various handle fastener mounting patterns. It may be difficult to procure replacement handles that match and mount to various mounting patterns that may be utilized on a common piece of cabinetry or furniture.

FIGS. 1-4 illustrate a drawer 10 from a household cabinet with a handle assembly 12 that is not limited to a singular mounting pattern. The handle assembly 12 is a cabinet drawer pull with an adjustable center-to-center mounting distance for use on cabinets and/or furniture, including those with non-standard, pre-drilled holes. The handle assembly 12 may be utilized on new installations or utilized to replace handle assemblies on existing cabinetry or furniture.

Figure 1:
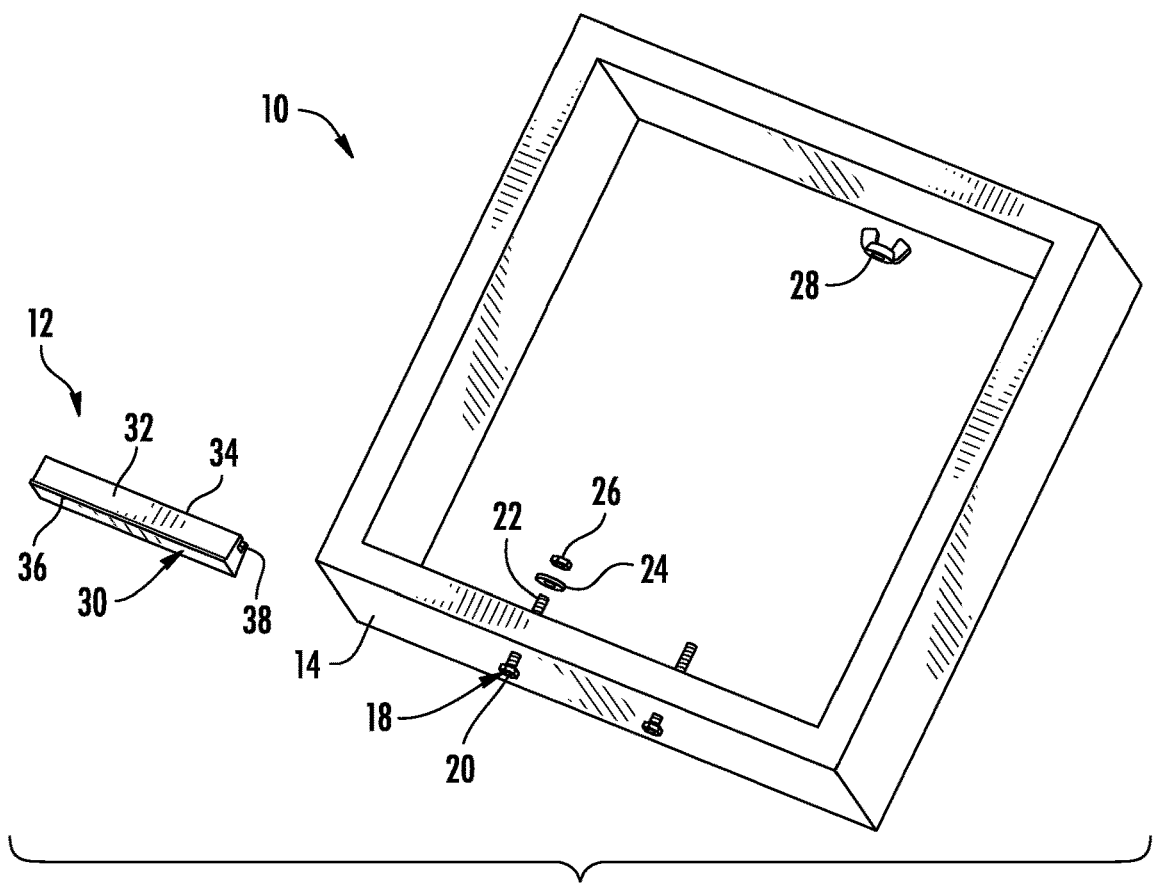
FIG. 1 is a partially exploded top perspective view of a drawer with a handle assembly according to an embodiment.
Figure 2:
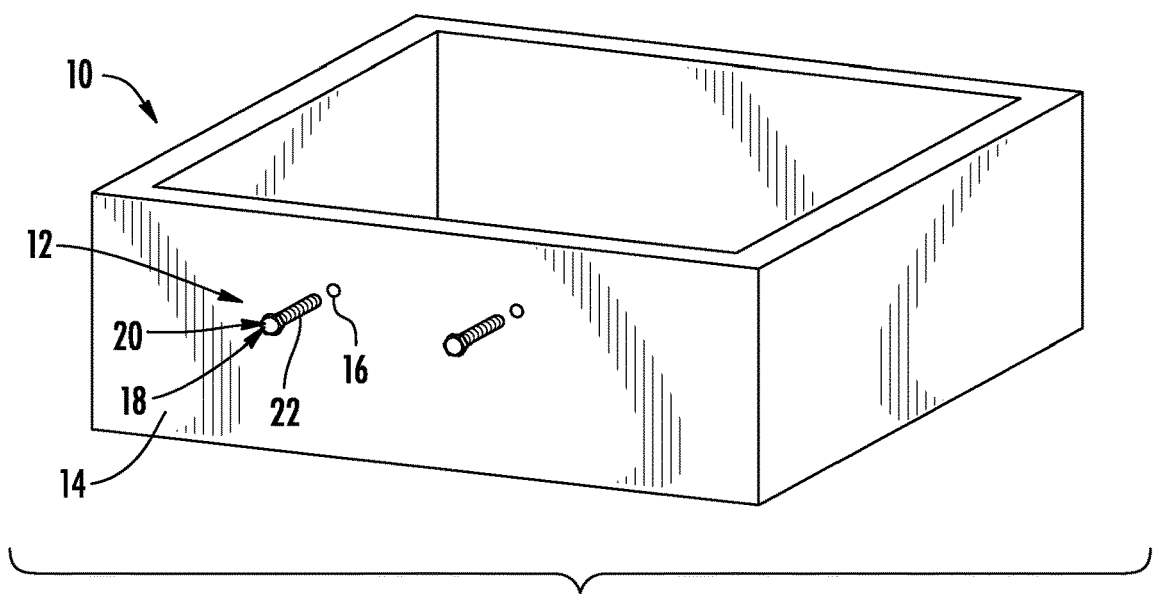
FIG. 2 is an exploded front perspective view of the drawer and the handle assembly of FIG. 1.

FIGS. 1-4 illustrate the handle assembly 12 in various installation steps. FIG. 1 illustrates the handle assembly 12 partially disassembled to illustrate the various components. FIG. 2 illustrates a front surface 14 of the drawer 10. The drawer front surface 14 includes a pair of apertures 16 formed through a thickness of the front surface 14. The apertures 16 may have been provided in an existing drawer 10 with a prior handle assembly, whereby the handle assembly 12 is a replacement. In this case, the prior handle assembly is removed before installing the handle assembly 12. Alternatively, the apertures 16 may be predrilled in a new drawer 10 for attachment of the handle assembly 12. The apertures 16 may also be drilled at the time of installation of the handle assembly 12.

A pair of first fasteners, bolts 18 are each inserted into one of the apertures 16 with a head 20 of the bolt 18 on the front surface 14 of the drawer 10, and an externally threaded shank 22 extending through the aperture 16 and into the drawer 10. The handle assembly 12 may be packaged with various bolts 18 with varying shank 22 lengths or diameters to accommodate drawers 10 of varying thicknesses with apertures 16 of varying diameters.

Referring again to FIG. 1, a plurality of second fasteners are attached to the threaded shanks 22 of the bolts 18. A flat washer 24 is placed upon each of the threaded shanks 22. A pair of internally threaded nuts, such as a hex nut 26 or a wing nut 28 is loosely installed upon each shank 22 within the drawer 10. Both the hex nut 26 and the wing nut 28 are depicted in FIG. 1 to illustrate two of the nut options. The hex nut 26 and the wing nut 28 are not yet tightened. Alternatively, instead of the wing nut 28, item 28 may be provided as a wing wrench 28 with an internal socket sized to receive the hex nuts 26 to manually tighten the hex nuts 26.

Figure 3:
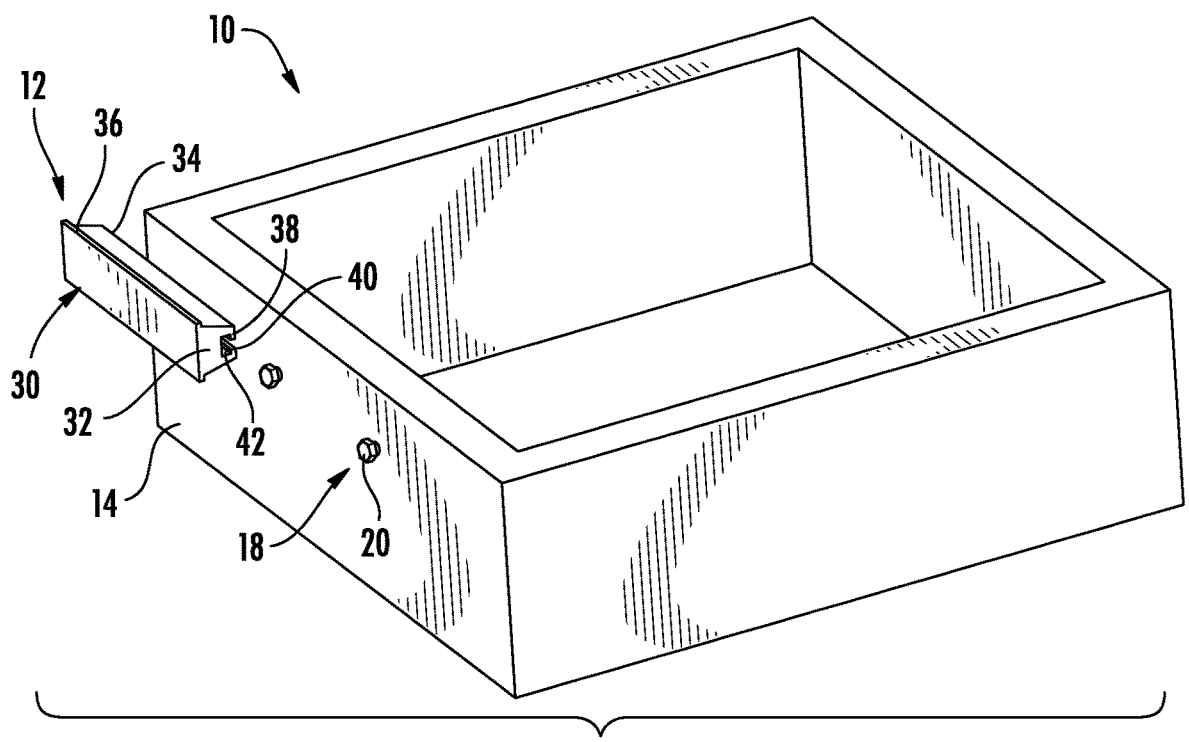
FIG. 3 is a partially exploded perspective view of the drawer and the handle assembly of FIG. 1.
Figure 4:
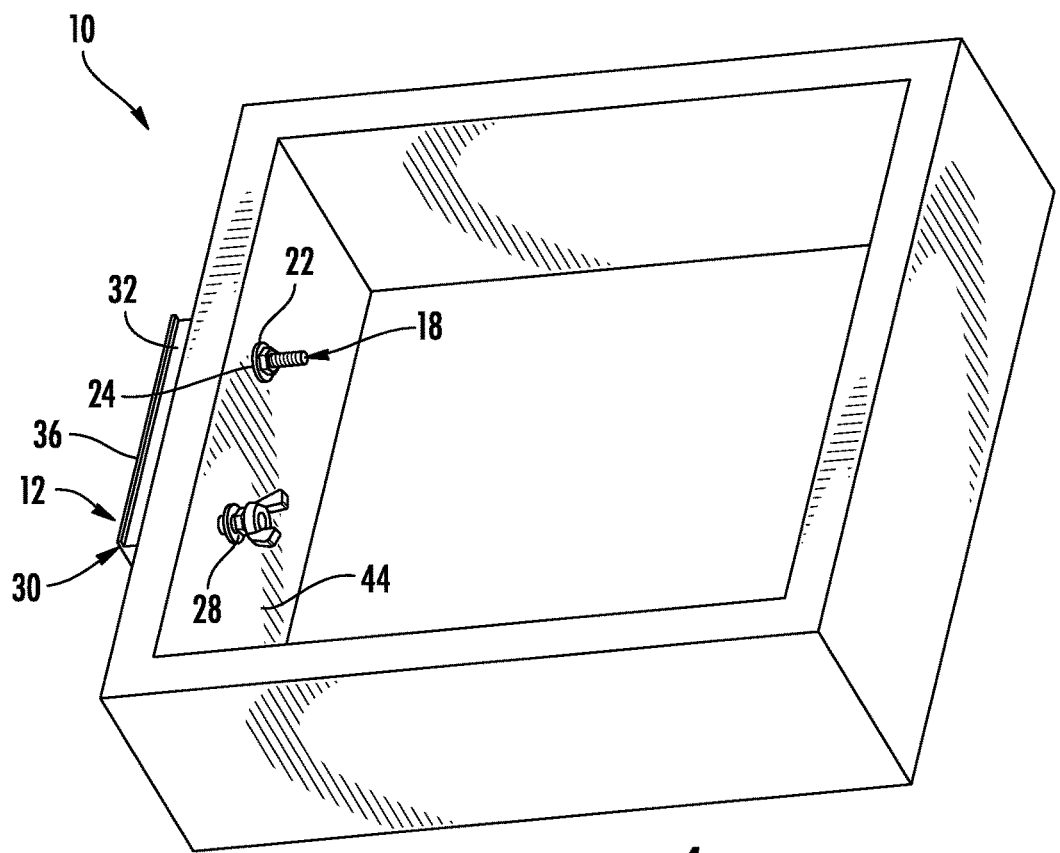
FIG. 4 is a top perspective view of the drawer and the handle assembly of FIG. 1.

Referring to FIGS. 1, 3 and 4, the handle assembly 12 includes a handle 30 to be installed upon the bolts 18. The handle 30 includes a body 32 with a flat mounting surface 34 to engage the front surface 14 of the drawer 10. A grip portion 36 is formed upon the body 32 spaced apart from the handle mounting surface 34 to be grasped and pulled by a user.

Referring to FIGS. 1 and 3, a slot 38 is formed along a length of the body 32 of the handle 30 to receive the heads 20 of the bolts 18. The slot 38 includes a narrow region at an opening 40 through the mounting surface 34. Referring now to FIG. 3, the opening 40 permits the shanks 22 of the bolts 18 to pass into the body 32 of the handle 30. The slot 38 also includes an enlarged region 42 intersecting with the opening 40. The enlarged region 42 is sized to receive the heads 20 of the bolts 18. The slot 38 is often referred to as a 'T-slot' or a 'T-shaped slot' due to the perpendicular intersection of the enlarged region 42 and the narrow opening 40.

The handle 30 may be formed from any suitable material, such as metal, wood, plastic, composite, or the like. The handle 30 may be extruded with a consistent cross-section.

As illustrated in FIG. 3, the handle 30 is slid onto the bolts 18 so that the heads 20 of the bolts 18 are received in the enlarged region 42 of the slot 38. The user can center the body 32 of the pull handle 30 as desired. Next, and with reference to FIG. 4, the user tightens the inside fasteners, hex nut 26 or wing nut 28, so that the pull handle 30 is held in place by a tensile force of the bolts 18 distributed inside face the slot 38 of the handle body 32 and a back face 44 of the drawer 10. The bolt heads 20 are formed with an array of wrench flats, such as a hex head 20 of the bolts 18. The enlarged region 42 of the slot 38 is sized to receive the hex heads 20 of the bolts 18 for translation therein, while preventing rotation of the hex heads 20, and consequently the bolts 18. Therefore, as the user tightens the inside fasteners 26, 28, the bolts 18 are tightened without requiring an additional tool or wrench. Friction of the loaded fasteners 18 within the handle slot 38 prevent side to side movement of the pull handle 30.

The handle assembly 12 offers adjustable center-to-center capability and efficient installation compared to prior art handle assemblies due to the channel 38 in the body 32 of the pull handle 30. Prior art designs provide adjustable posts that require the user to fix the center-to-center distance on the posts of the handle pull prior to installation, by use of set screws and other methods. The unitary handle 30 design eliminates adjustable posts, which can be difficult to align. The handle assembly 12 permits the user to start with the bolts 18 in the existing holes 16, and simply slide the pull handle 30 over the bolt heads 20 regardless of the spacing of the bolts 18. The handle assembly 12 may be employed in various mounting patterns of apertures 16 without requiring any adjustment to the handle 30.

Figure 5:
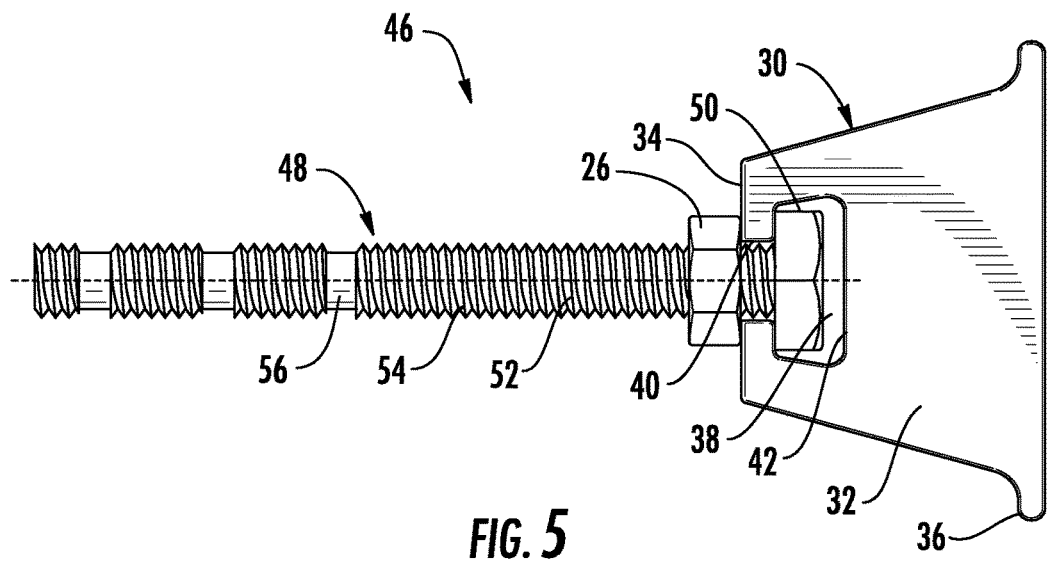
FIG. 5 is a side elevation view of a handle assembly according to another embodiment.

FIG. 5 illustrates a handle assembly 46 according to another embodiment. The handle assembly 46 is similar to the prior embodiment, with the handle 30, with the body 32 with the slot 38 formed therein along the length. The slot 38 includes the narrow opening 40 formed through the mounting surface 34 and intersecting the enlarged slot region 42. The handle 30 is provided with the grip portion 36 spaced apart from the mounting surface 34. A plurality of breakaway hex bolts 48 are provided with a hex head 50 to be received in the enlarged slot region 42. A shank 52 extends through the slot opening 40 with a length to address a plurality of standard drawer and door thicknesses. The shank 52 includes a plurality of threaded regions 54 to receive the nut 26 at various locations, each associated with a standard drawer or door thickness. The shank 52 also includes a plurality of unthreaded regions 56 to permit the user to break the bolt 48 to shorten the bolt 48 and remove an unused portion of the shank 52.

Figure 6:
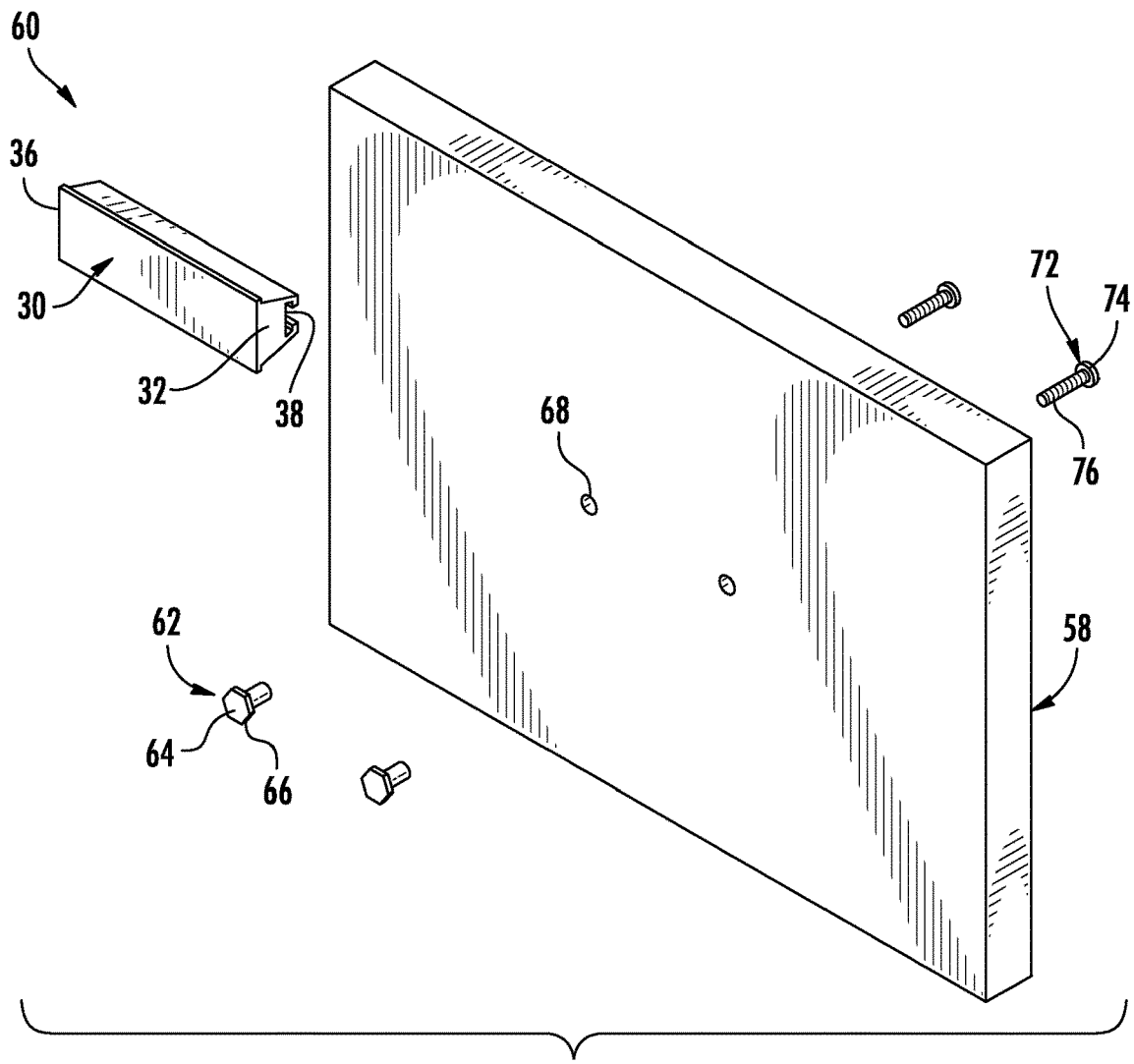
FIG. 6 is an exploded front perspective view of a door with a handle assembly according to another embodiment.
Figure 7:
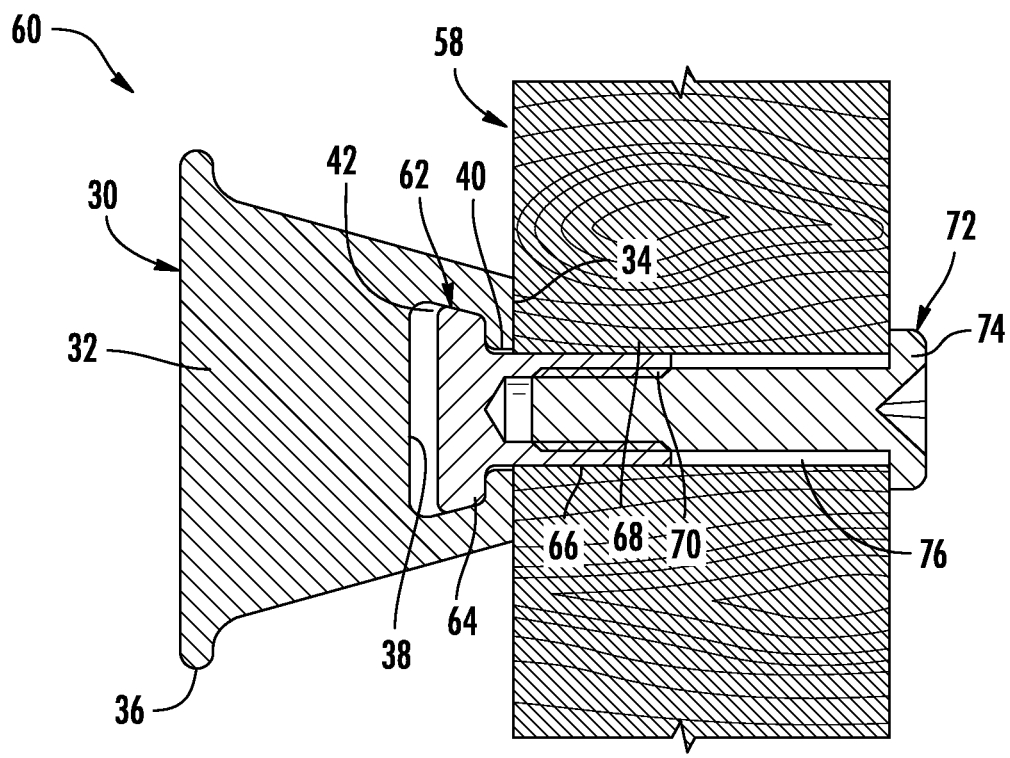
FIG. 7 is a side section view of the door with the handle assembly of FIG. 6.

FIGS. 6 and 7 illustrate a door 58 of a cabinet of furniture. A handle assembly 60 is provided according to another embodiment. The handle assembly 60 is similar to the prior embodiments, with the handle 30, with the body 32 with the slot 38 formed therein along the length. The slot 38 includes the narrow opening 40 formed through the mounting surface 34 and intersecting the enlarged slot region 42. The handle 30 is provided with the grip portion 36 spaced apart from the mounting surface 34.

The handle assembly 60 includes a pair of internally threaded fasteners 62 according to another embodiment. The fasteners 62 may include a hex head 64 sized to be received in the enlarged region 42 of the handle slot 38. A shank 66 extends from the hex head 64 and is sized to extend through the opening 40 of the handle slot 38 and partially into one of a pair of mounting apertures 68 in the door 58. The shank 66 of the fasteners 62 includes a blind depth, internally threaded aperture 70 as illustrated in FIG. 7.

During assembly, the hex nut shanks 66 are installed in the mounting apertures 68, and then the handle 30 is slid over the hex heads 64 into the slot 38. A pair of machine screws 72 are provided to be inserted into the apertures 68 of the door 58 at an inside of the door 58. The screws 72 include a head 74 to engage the inside of the door 58. The screws 72 also include an externally threaded shank 76 sized to extend into the aperture 68 of the door 58 and into threaded engagement with the internally threaded apertures 70 of the fasteners 62. The fasteners 62 are constrained from rotation within the slot 38. The machine screws 72 are tightened to secure the handle assembly 60 to the door 58.

Figure 8:
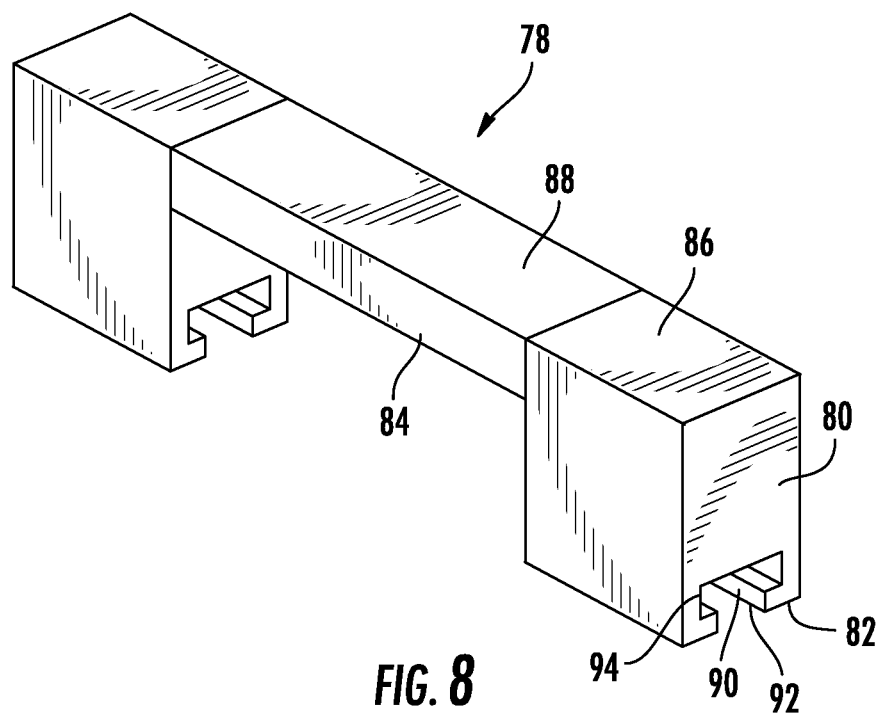
FIG. 8 is a perspective view of a handle according to another embodiment.

FIG. 8 illustrates a handle 78 according to another embodiment. The handle 78 includes a body 80 with a mounting surface 82 to be mounted to a drawer or door. An opening 84 is formed through the body 80 and intersecting the mounting surface 82 to divide the body 80 into a pair of spaced apart body portions 86 and a central grip portion 88. Similar to the prior embodiments, a slot 90 is formed lengthwise through the body 80 and extending through both body portions 86. The slot 90 includes an opening 92 for passage of a fastener shank and an enlarged portion 94 for receipt of a fastener hex head. The body portions 86 are sized laterally to provide a range of mounting aperture patterns. The body portions 86 act as handle posts but are static and are not adjustable relative to the grip portion 88.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A handle comprising:
    a body with a mounting surface to be mounted to a drawer or door, with a slot formed along a length of the body to receive a head of each of a plurality of fasteners to fasten the handle to a drawer or a door at various fastener mounting patterns; and
    a grip portion that is sized to extend from the body spaced apart from the slot and is sized to be grasped manually;
    wherein an opening is formed through the body adjacent the grip portion to be grasped manually and intersecting the mounting surface to divide the body into a pair of spaced apart body portions and the grip portion; and
    wherein the body portions are static and are not adjustable relative to the grip portion.

2. The handle of claim 1 wherein the handle is extruded.

3. The handle of claim 1 wherein the slot has a narrow region formed into the handle to permit the plurality of fasteners to pass into the handle, and an enlarged region intersecting the narrow region and sized to receive an enlarged portion of a fastener.

4. A handle assembly comprising:
    a handle sized to be grasped manually with a slot formed at least partially along a length; and
    a first plurality of fasteners each with a shank and a head sized to be received in the slot to fasten the handle to a drawer or a door at various fastener mounting patterns,
    a second plurality of fasteners sized to engage the shank of each of the first plurality of fasteners to fasten the handle to the drawer or the door; and
    a wing wrench with an internal socket sized to receive one of the second plurality of fasteners to manually tighten the second plurality of fasteners.

5. The handle assembly of claim 4 wherein the slot is formed along an entire length of the handle; and
    wherein the handle has a mounting surface to engage the drawer or door, and the first plurality of fasteners extend through the mounting surface.

6. The handle assembly of claim 4 wherein the shank of each of the first plurality of fasteners is externally threaded; and
    wherein each of the second plurality of fasteners is internally threaded and sized to receive each of the externally threaded shanks.

7. The handle assembly of claim 4 wherein the shank of each of the first plurality of fasteners is internally threaded; and
    wherein each of the second plurality of fasteners is externally threaded and sized to be received in the internally threaded shanks of the first plurality of fasteners.

8. The handle assembly of claim 4 wherein the second plurality of fasteners is each sized to be received upon the shank of each of the first plurality of fasteners to fasten the handle to the drawer or the door without an adjustable post to receive the first plurality of fasteners.

9. The handle assembly of claim 4 wherein the handle comprises:
    a body, wherein the slot is formed along the body; and
    a grip portion that is sized to extend from the body spaced apart from the slot and is sized to be grasped manually.

10. The handle assembly of claim 4 wherein the slot has a narrow region formed into the handle to permit the first plurality of fasteners to pass into the handle, and an enlarged region intersecting the narrow region and sized to receive the head of each of the first plurality of fasteners.

11. The handle assembly of claim 10 wherein the head of each of the first plurality of fasteners is formed with at least a pair of opposed flats sized to be received within the enlarged region of the slot; and
    wherein the enlarged region of the slot is sized to prevent rotation of each of the first plurality of fasteners.

12. The handle assembly of claim 4 wherein the second plurality of fasteners comprises a second plurality of hex nuts.

13. The handle assembly of claim 12 wherein the internal socket of the wing wrench is shaped as an internal hex socket.

14. A method to install a handle assembly comprising:
inserting a shank of at least one fastener with a plurality of unthreaded regions through an aperture in a drawer or a door;
providing a handle sized to be grasped manually with a slot formed along a length;
sliding the slot along a head of the at least one fastener;
tightening the at least one fastener; and
breaking the shank at one of the plurality of unthreaded regions to shorten the shank.

15. The method of claim 14 further comprising removing a handle assembly with at least one fastener from the aperture in the drawer or the door before inserting the shank of the at least one fastener through the aperture.

16. The method of claim 14 further comprising installing a second fastener upon the at least one fastener to tighten the at least one fastener.

17. The method of claim 14 further comprising removing an unused portion of the shank.

* * * * *